Nov. 6, 1928.

M. H. WARD 1,690,564

SPIRAL FILTER

Filed Feb. 4, 1927

INVENTOR
Marshall H. Ward
BY
Kenyon & Kenyon
ATTORNEY

Patented Nov. 6, 1928.

1,690,564

UNITED STATES PATENT OFFICE.

MARSHALL H. WARD, OF BROOKLYN, NEW YORK, ASSIGNOR TO MOTOR IMPROVEMENTS, INC., OF NEWARK, NEW JERSEY, A CORPORATION OF DELAWARE.

SPIRAL FILTER.

Application filed February 4, 1927. Serial No. 165,768.

This invention relates to filters and more particularly to that type known as spiral filters.

In filters of this type, a filtering envelope composed usually of some such material as cotton flannel is wound in the form of a spiral and arranged within a casing. Oil to be filtered is supplied either to the casing or to the interior of the filtering envelope, is passed through the walls thereof and then drained off for further use. In order to permit free flow of oil between the sides of the filtering envelope or between adjacent turns thereof, spacing members are provided. These spacers heretofore have usually been lengths of jute or other fibrous material which, after a period of use, become saturated with oil, thereby rendering them less efficient as spacers.

An object of this invention is a simple, inexpensive and efficient spacing member which is unaffected by the oil.

According to this invention, the spacer is made of metal such as steel, which is unaffected by the oil. Preferably it is composed of a pair of perforated thin steel sheets, the sheets being spaced from each other by the burrs formed in stamping out the perforations. The sheets are laterally slit at frequent intervals so that, despite the natural resiliency of the steel sheets, the spacer as a whole is substantially non-resilient. When such a spacer is rolled with a filtering envelope to form a filtering unit, it readily conforms to a spiral shape and provides a channel through which oil may flow freely.

Other objects, novel features and advantages of this invention will be apparent from the following specification and accompanying drawings, wherein Figure 1 is a perspective view of a filter embodying the invention;

Figure 1:
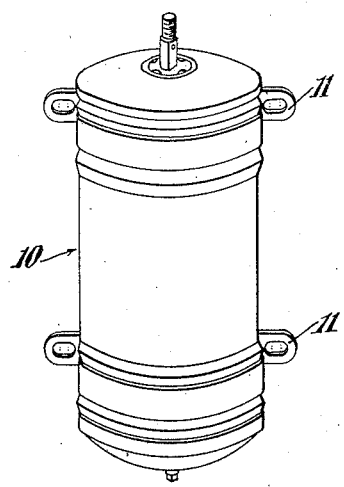
Figure 2:
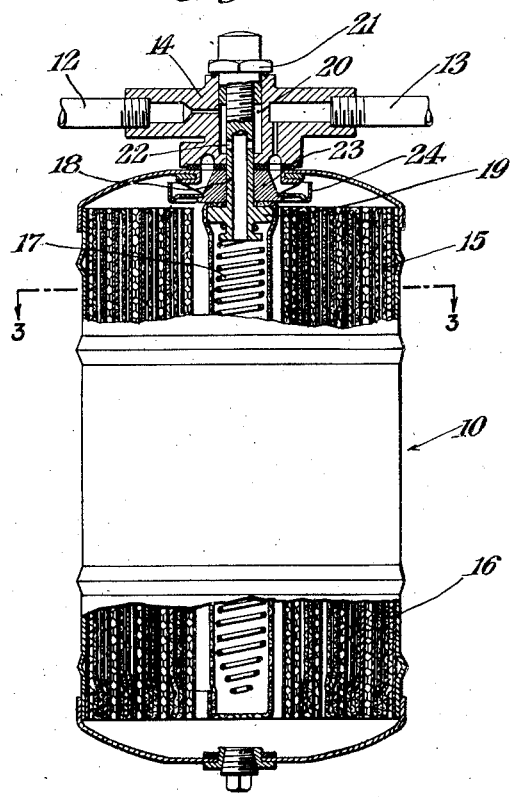
Fig. 2 is an enlarged view partially in vertical section and partially in elevation.
Figure 3:
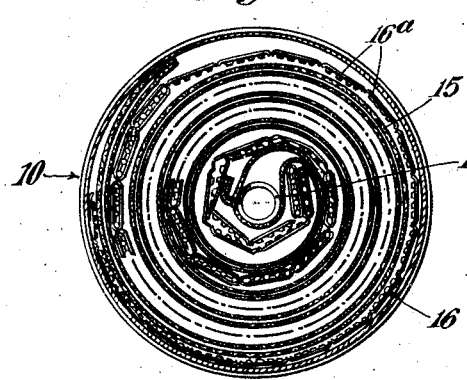
Fig. 3 is a section taken on the line 3—3 of Fig. 2.
Figure 4:
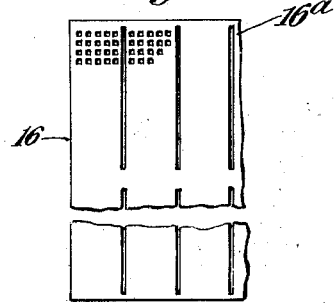
Fig. 4 is a plan view partially broken away of a metal sheet of which the spacer is composed.

Referring now to the drawings, 10 indicates a filter casing which may be supported in any suitable location by brackets 11 and which may be associated with an oil-distributing system of which the pipes 12 and 13 are a part by means of a suitable fitting 14.

Within the filter casing 10 is provided a filtering unit which comprises an envelope 15 of suitable filtering material, such, for example, as cotton flannel and a spacing member 16, the envelope and spacing member being spirally rolled up together.

The spacer 16 is made up of a pair of perforated metal strips 16$^a$ which are arranged with the burrs formed in the stamping operation around the perforations opposing each other. There is thus formed between the turns of the filtering envelope a spiral channel through which oil may flow freely. The metal strips are slit laterally at frequent intervals so that the spacer as a whole is substantially non-resilient despite the inherent resiliency in the metal of which the strips are composed. In one end of the filter envelope there is provided a spiral spring 17 to one end of which is attached a stem 18 having a collar 19. The collar 19 is arranged within the filtering envelope, whereas the remainder of the stem 18 projects beyond it. The filtering envelope and spacer are wound up around the spring 17 which provides a passageway for oil at the center of the filtering unit. The upper end of the stem 18 extends through a passageway in the fitting 14 and a nut 21 is threaded on its end. The stem 18 is hollow through a portion of its length and communicates through ports 22 with the passageway 20. Surrounding the stem 18 is a collar 23 between which and the collar 19 is received the edge of the filtering envelope. A shield 24 is mounted on the collar 23.

Assuming by way of illustration, that the filter shown is of the inside-out type, oil to be filtered is supplied through the pipe 12, passageway 20, ports 22 and stem 18 to the space provided by the spiral spring 17. It then follows along the interior of the filtering envelope and percolates through the walls thereof. The filtered oil then passes through the channel provided by the spacer 16 into the body of the casing from which it escapes through channels formed in the fitting 14 into the discharge pipe 13. It is apparent, of course, that the pipe 13 might be used to supply oil to the filter and the pipe 12 to discharge it therefrom, in which instance the passage of oil through the filter would be just reversed and there would be a spacing member provided within the filtering envelope as well as between its adjacent turns.

What I claim as new and desire to secure by Letters Patent of the United States is:

1. A spacer for a filtering unit of the type described comprising a reticulate strip of thin metal, said strip being laterally slit at intervals to render it substantially non-resilient longitudinally.

2. A spacer for a filtering unit of the type described comprising a strip of thin metallic material, said strip being perforated and being laterally slit at intervals.

3. The combination of a spirally wound filtering element with a metallic spacer substantially non-resilient longitudinally interposed between the portions of said element.

4. The combination of a spirally wound filtering element with a spacer interposed between the turns of said element, said spacer comprising a pair of substantially non-resilient metallic strips, said strips being perforated and being arranged to cause contact of the rough edges around said perforations.

5. The combination of a spirally wound filtering element with a spacer interposed between the turns of said elements, said spacer comprising a pair of strips of thin perforated metal, said strips being arranged to cause contact between the rough edges around said perforations whereby a drainage channel is formed, and being provided with a plurality of slits extending partially across the strip, whereby said strip is rendered substantially non-resilient.

6. A spacer for spiral filtering units comprising a strip of perforated metal laterally slit at frequent intervals.

7. A spacer for spiral filtering units comprising a pair of strips of perforated metal, laterally slit at frequent intervals and arranged with the burrs around the perforations of one sheet opposing the perforations of the other sheet.

In testimony whereof, I have signed my name to this specification.

MARSHALL H. WARD.